United States Patent
Guo et al.

(10) Patent No.: US 10,514,492 B2
(45) Date of Patent: Dec. 24, 2019

(54) BACKLIGHT MODULE AND MOBILE TERMINAL

(71) Applicant: WUHAN CHINA STAR OPTOELECTRONICS TECHNOLOGY CO., LTD, Wuhan, Hubei (CN)

(72) Inventors: Qing Guo, Hubei (CN); Yan Cheng, Hubei (CN)

(73) Assignee: Wuhan China Star Optoelectronics Technology Co., Ltd., Wuhan, Hubei (CN)

( * ) Notice: Subject to any disclaimer, the term of this patent is extended or adjusted under 35 U.S.C. 154(b) by 107 days.

(21) Appl. No.: 15/567,731

(22) PCT Filed: Jul. 25, 2017

(86) PCT No.: PCT/CN2017/094324
§ 371 (c)(1),
(2) Date: Oct. 19, 2017

(87) PCT Pub. No.: WO2019/000530
PCT Pub. Date: Jan. 3, 2019

(65) Prior Publication Data
US 2019/0004239 A1  Jan. 3, 2019

(51) Int. Cl.
*F21V 8/00* (2006.01)

(52) U.S. Cl.
CPC ........... *G02B 6/0085* (2013.01); *G02B 6/002* (2013.01); *G02B 6/005* (2013.01); *G02B 6/0088* (2013.01)

(58) Field of Classification Search
CPC ...... G02B 6/0085; G02B 6/005; G02B 6/002; G02B 6/0088
See application file for complete search history.

(56) References Cited

U.S. PATENT DOCUMENTS

| 8,926,144 | B2 * | 1/2015 | Yu ..................... G02F 1/133605 362/327 |
| 2011/0228559 | A1 * | 9/2011 | Kinder ................. G02B 6/0028 362/608 |

(Continued)

FOREIGN PATENT DOCUMENTS

| CN | 101338867 A | 1/2009 |
| CN | 102628566 A | 8/2012 |

(Continued)

*Primary Examiner* — Evan P Dzierzynski
(74) *Attorney, Agent, or Firm* — Mintz Levin Cohn Ferris Glovsky and Popeo, P.C.; Steven M. Jensen

(57) ABSTRACT

The present disclosure discloses a backlight module including a light guide plate, an optical diaphragm group disposed on a light exiting surface of the light guide plate, and a backlight source disposed at a light incident end of the light guide plate, a middle frame, a radiating fin and a heat conducting connector. The middle frame is disposed on an outer surface of the backlight module and includes a bottom plate and a side wall. The radiating fin is attached to an internal surface of the bottom plate of the middle frame, and the heat conducting connector includes a first portion that contacts the backlight source and a second portion that only contacts a partial region of the radiating fin. The present disclosure also discloses a mobile terminal.

18 Claims, 1 Drawing Sheet

(56) References Cited

U.S. PATENT DOCUMENTS

2015/0167952 A1* 6/2015 Lee .................. F21V 29/70
                                                362/612
2015/0369994 A1   12/2015 Chae et al.
2017/0254518 A1*  9/2017 Vasylyev ............. G02B 6/0068

FOREIGN PATENT DOCUMENTS

| CN | 102818185 A | 12/2012 |
|----|-------------|---------|
| CN | 202647441 U | 1/2013  |
| CN | 103003620 A | 3/2013  |
| CN | 103672816 A | 3/2014  |
| CN | 203703748 U | 7/2014  |
| CN | 104730764 A | 6/2015  |
| CN | 204536695 U | 8/2015  |
| CN | 206115098 U | 4/2017  |
| CN | 106680928 A | 5/2017  |
| KR | 20010017691 A | 3/2001 |

\* cited by examiner

BACKLIGHT MODULE AND MOBILE TERMINAL

CROSS-REFERENCES TO RELATED APPLICATIONS

This application is a U.S. national phase application, pursuant to 35 U.S.C. § 371, of PCT/CN2017/094324, filed Jul. 25, 2017, designating the United States, which claims priority to Chinese Application No. 201710522151.7, filed Jun. 30, 2017. The entire contents of the aforementioned patent applications are incorporated herein by this reference.

TECHNICAL FIELD

The present disclosure relates to the technical field of display, and more particularly, to a backlight module and a mobile terminal.

BACKGROUND ART

With the increasing demands for display devices of consumers, the requirements on display techniques also become higher and higher, especially in the aspect of mobile display products such as mobile phones. With increasingly high ppi (pixels per inch, i.e., a unit of image resolution), luminance is definitely required to be higher and higher, which will then cause the generation of excessive heat from devices such as a backlight device or a converter. If the heat cannot be dissipated in time, a great hidden trouble will be brought to security and life of a mobile device, and thus, the heat must be dissipated through timely and effective means. However, considering the limited internal space of the mobile phone, not only cannot a traditional means of attaching a heat dissipation material better dissipate the heat generated inside the module out, but also a thickness of the module will be increased.

SUMMARY

In view of the defects existing in the prior art, the present disclosure provides a backlight module and a mobile terminal which can guarantee good heat dissipation performance on the premise that a thickness of the backlight module is not increased.

In order to achieve the above purposes, the present disclosure adopts the following technical solutions.

A backlight module includes a light guide plate, an optical diaphragm group disposed on a light exiting surface of the light guide plate, and a backlight source disposed at a light incident end of the light guide plate, a middle frame, a radiating fin and a heat conducting connector. The middle frame is disposed on an outer surface of the backlight module and includes a bottom plate and a side wall. The radiating fin is attached to an internal surface of the bottom plate of the middle frame, and the heat conducting connector includes a first portion that contacts the backlight source and a second portion that only contacts a partial region of the radiating fin.

As one embodiment thereof, the backlight module also includes a reflective sheet that is attached to the light guide plate and disposed opposite to the radiating fin.

As one embodiment thereof, an end portion of the light guide plate close to the backlight source is a pillow portion that has a thickness greater than that of a portion where the optical diaphragm group is placed.

As one embodiment thereof, a surface of the pillow portion towards the optical diaphragm group is an inclined surface, and an angle between the inclined surface and the portion of the light guide plate on which the optical diaphragm group is placed is an obtuse angle.

As one embodiment thereof, the heat conducting connector is a heat conducting block fitted at a surface of a substrate of the backlight source and one end of the radiating fin.

As one embodiment thereof, the substrate of the backlight source is a flexible circuit board.

As one embodiment thereof, a surface of the radiating fin towards the light guide plate is disposed with a plurality of protruding columns.

As one embodiment thereof, the heat conducting connector includes a carrying plate and a plurality of spring sheets disposed on a bottom surface of the carrying plate, spring sheets are compressed to be interposed between the carrying plate and the radiating fin, the light guide plate and the backlight source are carried on an upper surface of the carrying plate, and the backlight source is attached to one end of the carrying plate.

Another purpose of the present disclosure lies in providing a mobile terminal including a display panel and any one of the above backlight modules, and the display panel is fixed in an opening of the middle frame.

The present disclosure may effectively conduct heat generated by the backlight module to the middle frame of the mobile terminal, and then concentratedly dissipate the heat out, which reduces heat dissipation costs and increases service life of a device at the same time without an obvious increase on a thickness of a module.

DETAILED DESCRIPTION OF EXEMPLARY EMBODIMENTS

In order for the purpose, technical solutions and advantages of the present disclosure to be clearer and better understood, the present disclosure will be further explained in detail below in conjunction with the figures and embodiments. It should be understood that special embodiments described here are only used to explain the present disclosure, but not used to define the present disclosure.

A mobile terminal (such as a mobile phone, a tablet computer and so on) of the present disclosure includes a backlight module and a display panel. The backlight module provides a displayed backlight source for the display panel, and includes a light guide plate, an optical diaphragm group disposed on a light exiting surface of the light guide plate, a middle frame, a radiating fin, a heat conducting connector, and a backlight source disposed at a light incident end of the light guide plate. The middle frame is the middle frame of the mobile terminal, and performs the functions of assembling and protecting a frame as a main housing of the mobile terminal, and the middle frame is disposed on an outer surface of the backlight module and includes a bottom plate and a side wall. The radiating fin is attached to an internal surface of the bottom plate of the middle frame, and the heat conducting connector includes a first portion that contacts the backlight source and a second portion that only contacts a partial region of the radiating fin.

The first portion of the heat conducting connector contacts the backlight source, and the second portion thereof only contacts the partial region of the radiating fin, so that a space corresponding to other portions that are not disposed with the heat conducting connector may be compressed as much as possible to be made as thin as possible; meanwhile, the heat conducting connector may concentrate heat dissipated from the backlight source and then conduct to the middle frame of the mobile terminal, which provides excellent heat dissipation performance.

Embodiment 1

Figure 1:
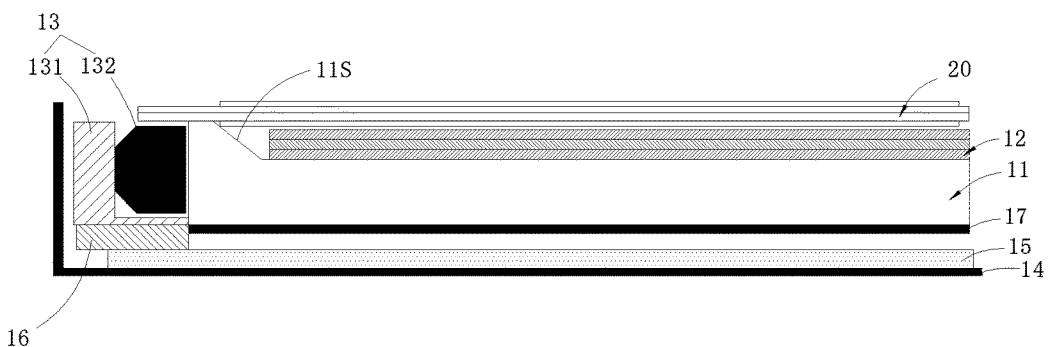
FIG. 1 is a structure schematic diagram of a mobile terminal of Embodiment 1 of the present disclosure.

Referring to FIG. 1, a mobile terminal of the present embodiment includes a backlight module 10 and a display panel 20. The display panel 20 is fixed in an opening of a middle frame 14, and a surface of the display panel 20 may also be covered with a touch screen. The backlight module mainly includes a light guide plate 11, an optical diaphragm group 12 disposed on a light exiting surface of the light guide plate 11, a middle frame 14, a radiating fin 15, a heat conducting connector 16, a backlight source 13 disposed at a light incident end of the light guide plate 11, and a reflective sheet 17 attached on the light guide plate 11 and disposed opposite to the radiating fin 15. The middle frame 14 is disposed on an outer surface of the backlight module and includes a bottom plate and a side wall. The radiating fin 15 is attached to an internal surface of the bottom plate of the middle frame 14, and the heat conducting connector 16 includes a first portion that contacts the backlight source 13 and a second portion that only contacts a partial region of the radiating fin 15.

An end portion of the light guide plate 11 of the present embodiment close to the backlight source 13 is a pillow portion that has a thickness greater than that of another portion (i.e., a portion where the optical diaphragm group 12 is placed). The backlight source 13 includes a substrate 131 and a plurality of point light sources 132 that are disposed at an internal surface of the substrate 131 in an array. Here, the point light sources 132 face a light incident side of the light guide plate 11, such that a part of light that is incident to the light guide plate 11 from the point light sources 132 may be stored in the pillow portion, which improves light utilization efficiency to the largest extent. Further, a surface of the pillow portion towards the optical diaphragm group 12 is an inclined surface 11S, and an angle between the inclined surface 11S and the portion of the light guide plate 11 on which the optical diaphragm group 12 is placed is an obtuse angle. Light emitted from the backlight source 13 is mostly reflected by the inclined surface 11S back to inside of the light guide plate 11 for a secondary utilization.

Here, the optical diaphragm group 12 is a composite structure formed by laminating multiple layers of optical diaphragms, and may include an upper prism sheet, a lower prism sheet, and a diffusion sheet interposed between the two layers of prism sheets. The heat conducting connector 16 is a heat conducting block attached at a surface of a substrate of the backlight source 13 and one end of the radiating fin 15, and is not overlapped with the reflective sheet 17 in a thickness direction, that is, disposed adjacent to the reflective sheet 17. In particular, the heat conducting connector 16 uses a graphite sheet as a base material, and upper and lower surfaces of the base material are both coated with a composite film formed by combining viscous and elastic adhesive layers. The substrate of the backlight source 13 is a flexible circuit board. A via hole for embedding of the heat conducting connector 16 may be disposed on one side of the reflective sheet 17 close to the backlight source 13. After the assembling of the backlight source 13, a free end of the flexible circuit board thereof is bent towards a rear face of the light guide plate 11, the heat conducting connector 16 is embedded into the corresponding via hole on the reflective sheet 17 and is attached to a surface of the bent flexible circuit board to be misaligned with the bent electrical element of the flexible circuit board, which will not increase a thickness of the backlight module 10 basically.

In other embodiments, a surface of the radiating fin 15 facing the light guide plate 11 is also disposed with a plurality of protruding columns which support between the radiating fin 15 and the reflective sheet 17 after the completion of the assembly of the backlight module 10, so as to assist in maintaining a distance between the light guide plate 11 and the radiating fin 15.

Embodiment 2

Figure 2:
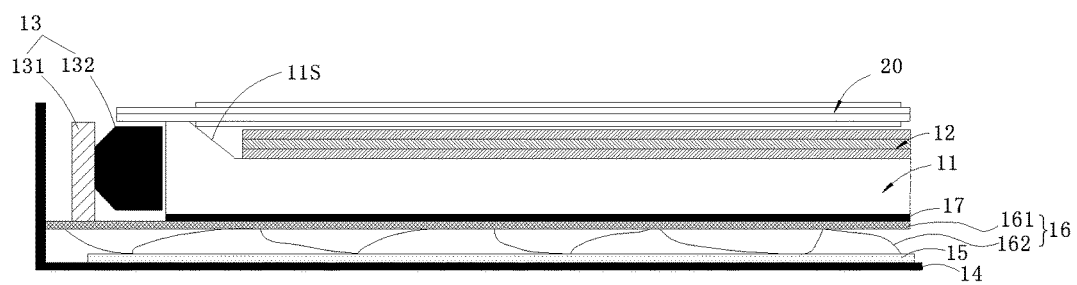
FIG. 2 is a structure schematic diagram of a mobile terminal of Embodiment 2 of the present disclosure.

As illustrated in FIG. 2, different from Embodiment 1, a heat conducting connector 16 of the present embodiment includes a carrying plate 161 and a plurality of spring sheets 162 disposed on a bottom surface of the carrying plate 161. The compressed spring sheets 162 are interposed between the carrying plate 161 and a radiating fin 15, a light guide plate 11 and a backlight source 13 are carried on an upper surface of the carrying plate 161, and the backlight source 13 is attached to one end of the carrying plate 161. The carrying plate 161 may be also used as a flatness holder of the light guide plate 11. The spring sheets 162 are disposed on the carrying plate 161 in an array. When assembling the backlight module 10, a module having metal springs 162 is placed on the radiating fin 15 of a middle frame 14, the compressed springs 162 are nearly completely fitted on the radiating fin 15 to also form a plurality of radiating fins simultaneously, which may improve heat dissipation efficiency significantly.

The present disclosure may effectively conduct heat generated by the backlight module to the middle frame of the mobile terminal, and then concentratedly dissipate the heat out, which reduces heat dissipation costs and increases service life of a device at the same time without an obvious increase on a thickness of a module.

The above statements are only the specific embodiments of the present application, it should be pointed out that, to those ordinary skilled in the art, a plurality of improvements and polish can be made without departing the principle of the present application, and those improvements and polish should also be considered as the protection scope of the present application.

What is claimed is:

1. A backlight module, comprising:
    a light guide plate;
    an optical diaphragm group disposed on a light exiting surface of the light guide plate;
    a backlight source disposed at a light incident end of the light guide plate;
    a middle frame disposed at an outer surface of the backlight module and comprising a bottom plate and a side wall;
    a radiating fin attached to an internal surface of the bottom plate of the middle frame; and
    a heat conducting connector comprising a first portion that contacts the backlight source and a second portion that only contacts a partial region of the radiating fin,
    wherein the heat conducting connector comprises a carrying plate and a plurality of spring sheets disposed on a bottom surface of the carrying plate, spring sheets are compressed to be interposed between the carrying plate and the radiating fin, the light guide plate and the backlight source are carried on an upper surface of the carrying plate, and the backlight source is attached to one end of the carrying plate.

2. The backlight module of claim 1, wherein the heat conducting connector includes a heat conducting block fitted at a surface of a substrate of the backlight source and one end of the radiating fin.

3. The backlight module of claim 2, wherein the substrate of the backlight source is a flexible circuit board.

4. The backlight module of claim 2, wherein a surface of the radiating fin towards the light guide plate is disposed with a plurality of protruding columns.

5. The backlight module of claim 1, further comprising a reflective sheet that is attached to the light guide plate and disposed opposite to the radiating fin.

6. The backlight module of claim 1, wherein an end portion of the light guide plate close to the backlight source is a pillow portion that has a thickness greater than that of a portion of the light guide plate on which the optical diaphragm group is placed.

7. The backlight module of claim 6, wherein a surface of the pillow portion towards the optical diaphragm group is an inclined surface, and an angle between the inclined surface and the portion of the light guide plate on which the optical diaphragm group is placed is an obtuse angle.

8. The backlight module of claim 7, wherein the heat conducting connector includes a heat conducting block fitted at a surface of a substrate of the backlight source and one end of the radiating fin.

9. The backlight module of claim 8, wherein the substrate of the backlight source is a flexible circuit board.

10. The backlight module of claim 8, wherein a surface of the radiating fin towards the light guide plate is disposed with a plurality of protruding columns.

11. A mobile terminal, comprising:
a display panel; and
a backlight module comprising:
  a light guide plate;
  an optical diaphragm group disposed on a light exiting surface of the light guide plate;
  a backlight source disposed at a light incident end of the light guide plate;
  a middle frame disposed on an outer surface of the backlight module and comprising a bottom plate and a side wall;
  a radiating fin attached to an internal surface of the bottom plate of the middle frame; and
  a heat conducting connector comprising a first portion that contacts the backlight source and a second portion that only contacts a partial region of the radiating fin,
wherein the display panel is fixed in an opening of the middle frame, and
wherein the heat conducting connector comprises a carrying plate and a plurality of spring sheets disposed on a bottom surface of the carrying plate, spring sheets are compressed to be interposed between the carrying plate and the radiating fin, the light guide plate and the backlight source are carried on an upper surface of the carrying plate, and the backlight source is attached to one end of the carrying plate.

12. The mobile terminal of claim 11, wherein the heat conducting connector includes a heat conducting block fitted at a surface of a substrate of the backlight source and one end of the radiating fin.

13. The mobile terminal of claim 12, wherein the substrate of the backlight source is a flexible circuit board.

14. The mobile terminal of claim 12, wherein a surface of the radiating fin towards the light guide plate is disposed with a plurality of protruding columns.

15. The mobile terminal of claim 11, wherein an end portion of the light guide plate close to the backlight source is a pillow portion that has a thickness greater than that of a portion on which the optical diaphragm group is placed.

16. The mobile terminal of claim 15, wherein a surface of the pillow portion towards the optical diaphragm group is an inclined surface, and an angle between the inclined surface and the portion of the light guide plate on which the optical diaphragm group is placed is an obtuse angle.

17. The mobile terminal of claim 16, wherein the heat conducting connector includes a heat conducting block fitted at a surface of a substrate of the backlight source and one end of the radiating fin.

18. The mobile terminal of claim 11, further comprising a reflective sheet that is attached to the light guide plate and disposed opposite to the radiating fin.

* * * * *